United States Patent [19]

Edwards et al.

[11] Patent Number: 5,762,658
[45] Date of Patent: Jun. 9, 1998

[54] SELF-SUSTAINING HYDROGENE GENERATOR

[75] Inventors: Neil Edwards, Reading; Jonathon C. Frost, Henley On Thames; Ann-Marie Jones, Birmingham; John F. Pignon, Benson, all of United Kingdom

[73] Assignee: Johnson Matthey Public Limited Company, London, England

[21] Appl. No.: 776,472

[22] PCT Filed: Jun. 26, 1995

[86] PCT No.: PCT/GB95/01500

§ 371 Date: Dec. 23, 1996

§ 102(e) Date: Dec. 23, 1996

[87] PCT Pub. No.: WO96/00186

PCT Pub. Date: Jan. 4, 1996

[30] Foreign Application Priority Data

Jun. 24, 1994 [GB] United Kingdom ............... 9412786

[51] Int. Cl.⁶ ............... B01J 7/00; C10L 3/00; C07C 1/02; C01B 4/00
[52] U.S. Cl. ............... 48/127.7; 48/61; 423/648.1; 252/373
[58] Field of Search ............... 423/648.1, 415.1, 423/437 R; 252/373; 48/61, 127.7

[56] References Cited

U.S. PATENT DOCUMENTS

| 4,789,540 | 12/1988 | Jenkins ............... 423/648.1 |
| 4,981,676 | 1/1991 | Minet et al. ............... 423/652 |

FOREIGN PATENT DOCUMENTS

| 217532 | 4/1987 | European Pat. Off. . |
| 262947 | 4/1988 | European Pat. Off. . |
| 2220617 | 11/1973 | Germany . |

Primary Examiner—Ardin H. Marschel
Assistant Examiner—Jezia Riley
Attorney, Agent, or Firm—Pillsbury Madison & Sutro LLP

[57] ABSTRACT

A self-starting, self-sustaining hydrogen generator comprises a reactor packed with a mass of mixed catalyst, containing supported copper and palladium. A feedstock, of e.g. methanol and an oxygen source such as air, is injected at high velocity into the mass of catalyst through a multi-point entry such as a tube of porous ceramic. The mass of catalyst is preferably configured concentrically around the tube injector, so that the fluid-flow follows a radial path through the reactor. The product gas is high in hydrogen and can be used as a feed for a fuel cell.

17 Claims, 2 Drawing Sheets

SELF-SUSTAINING HYDROGENE GENERATOR

This application is the national phase of international application PCT/GB95/01500, filed Jun. 26, 1995 which designated the U.S.

This invention concerns improvements in reformers, more especially it concerns improvements in self-sustaining reformers that start-up from ambient temperature. The volume-specific hydrogen output of these improved reformers makes them suitable for application in fuel-cell powered vehicles.

We have disclosed in EP 0 217 532, a self-igniting partial oxidation reformer or catalytic hydrogen generator which has become known as the "Hot Spot" reactor. The basic concept is that methanol and air are co-fed into a reactor containing a packed bed of copper on refractory support catalyst, with a down-stream zone containing platinum or palladium catalyst mixed with copper catalyst The down-stream zone provides self-ignition to raise the reactor temperature to a point a hot spot formed around the point of injection of feedstock into the bed of catalyst. This concept was further developed in the invention of EP 0 262 947, which uses this reactor design to produce hydrogen from hydrocarbons, but using a catalyst composed of platinum and chromium oxide on a support. Further details have been given in a paper in Platinum Metals Review, 1989, 33, (3) 118–127.

As predicted in the above-mentioned prior art, the use of liquid fuels as hydrogen sources for fuel-cell powered vehicles, or even static systems, is attracting considerable interest. The best established conversion system is steam reforming, but this is an endothermic reaction, requiring continuous input of energy. Whilst self-sustaining reforming is clearly an interesting concept, in further studies of the Hot-Spot system, we have found that the reactor as described did not permit scale-up, and therefore there was a need to find alternative and improved reactor and/or system designs.

The present invention provides a self-igniting and self-sustaining hydrogen generation reactor for a feedstock fluid comprising an organic fuel in liquid, atomised (spray), vapour or gas form and a source of oxygen, such as air, said reactor comprising a bed of a permeable fixed bed of copper-supported catalyst and a PGM-supported catalyst, said reactor further comprising an inlet for the feedstock which comprises a multiplicity of restricted entries causing high velocity feedstock injection into the bed together with a significant pressure drop and gas expansion, for example an extended surface area of porous ceramic. Preferably, the inlet is in the form of a porous ceramic tube having a closed end, but other inlet designs may give advantages in particular circumstances.

The invention also provides a method for the production of hydrogen from a feedstock comprising passing an organic fuel and a source of oxygen, such as air, over a bed which is a mass of catalyst comprising copper and palladium or other PGM moieties, characterised in that the fuel is in spray, vapour or gas form and further characterised in that the feedstock enters the mass of catalyst through a multiplicity of entries which cause a significant pressure drop at least sufficient to prevent back-flow of products and results in high velocity injection of feedstock into the bed and feedstock expansion. For example, the entries may be in the form of an inlet having an extended surface area of porous ceramic.

The porous ceramic used in initial tests was a commercial ceramic of pore size 100 μm, purchased from Fairey, England, and this material is therefore recommended, but we expect that alternative porous ceramic materials will provide substantially similar results. It appears that porous metal inlets, whilst having similar gas flow characteristics to porous ceramics, are unsuitable because heat conduction interferes with the reactions being carried out, and could even cause premature ignition of the methanol/air mixture, for example within the feed tube. However, it is possible that further material developments, and/or further reactor design improvements, may permit composite metal/ceramic inlet design, which may bring advantages, such as in structural strength.

The organic fuel can be a hydrocarbon or an oxygenate, either in the liquid or gas phase. For ease of description, a liquid oxygenate, methanol, will be referred to in the following description.

In the method of the invention, a hot zone forms around the region where the feedstock enters the mass of catalyst. It is believed that this hot zone is preferably at a temperature of 350°–600° C. In this zone, methanol is partially oxidised to form $CO_2$ and $H_2$, and some CO. In a preferred embodiment, water is co-fed with the methanol. The, presence of water has several beneficial effects:

(i) It promotes the water-gas shift reaction; thus improving the efficiency of the generator and lowering the concentration of CO in the reformate from 2–8% to 1–5% by volume, and raising concurrently the $H_2$ concentration.

(ii) It allows greater thermal control within the catalyst bed.

(iii) Under some conditions, it can react directly with methanol by steam reforming, leading to a high yield of $H_2$.

The water can be pre-mixed with the methanol feed. The water concentration in the aqueous mixture should be between 1% and 40% by mass, with the preferred concentration being in the range 10–30%.

Conventional hydrogen-generators that depend solely or predominantly on the steam-reforming of an organic reactant require continuous input of energy during operation to supply the endothermic heat of reaction. For example, where the organic reactant is methanol:

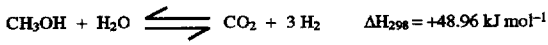

In the present invention, self-sustaining hydrogen generation is achieved by catalysing the exothermic conversion of the reactant, so obviating the need for continuous input of energy:

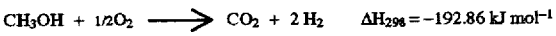

We have discovered that Cu-based catalysts are very effective for the latter reaction. It is necessary, however, to add a small amount of precious metal catalyst to provide auto-ignition, and to raise the catalyst bed temperature to a level at which the partial oxidation becomes self-sustaining. When the precious metal catalyst is $Pd/SiO_2$, containing 3% palladium by mass, it needs only to be present as 5% of the total mass of the catalyst bed in order to induce ignition from room temperature. Other pre-heating methods may be used, however.

It is believed, although we do not wish to be limited to any expression of theory, that there are several key physical and chemical features in the design of an effective self-sustaining partial-oxidation reformer. The flow restriction caused by the porous ceramic creates a pressure drop, resulting in the pore openings acting as small injection points that supply fluid flow at high velocity into the catalyst bed. Then, in order for the conversion of methanol to occur exclusively by the catalytic partial-oxidation route, both the following conditions must apply within the catalyst bed:

(a) the reactant velocity must exceed the homogeneous flame speed.

(b) the catalyst must be active enough for the heterogeneous reaction to occur within the short residence time.

To eliminate the possibility of product hydrogen undergoing oxidation, it must be prevented from re-entering a high temperature region in which oxygen is present. To do this, the pressure drop across the ceramic must be high enough to prevent back-flow of products. If the porous ceramic is in the form of a tube or cylinder, the catalyst bed should be arranged concentrically to allow radial flow, and so ensure a minimum path-length through the bed.

It is desirable to reduce or minimise the amount of CO in the product gas fed to the fuel cell. This can be achieved by one or both of passing the product gas over a selective oxidation catalyst that selectively oxidises CO in preference to hydrogen, and passing the product gas over a low temperature water-gas shift catalyst.

The invention will now be illustrated by the following Examples, and with reference to the accompanying drawings which are schematic cross-sections of reactors according to the invention.

EXAMPLE 1

A batch of catalyst was made by adding copper(II) ethanoate (71 g) to aqueous ammonia, which had been prepared by adding distilled water (3150 cm$^3$) to a concentrated solution (0.880) of ammonia (350 cm$^3$). This ammoniacal copper-solution was added to silica spheres (Shell S980B; 750 g) in a rotating blender, which was operated for 1 hour to ensure thorough mixing. The silica spheres were then isolated and washed three times with distilled water, before being dried (110° C.; 16 hr) and calcined (450° C.; 2 hr). Elemental analysis showed that the resultant copper-loading on the silica spheres was 1.9% (by mass). Before being loaded into hydrogen-generator, the catalyst was activated by reduction (400° C.; 2 hr; 10% $H_2/N_2$).

Figure 1:
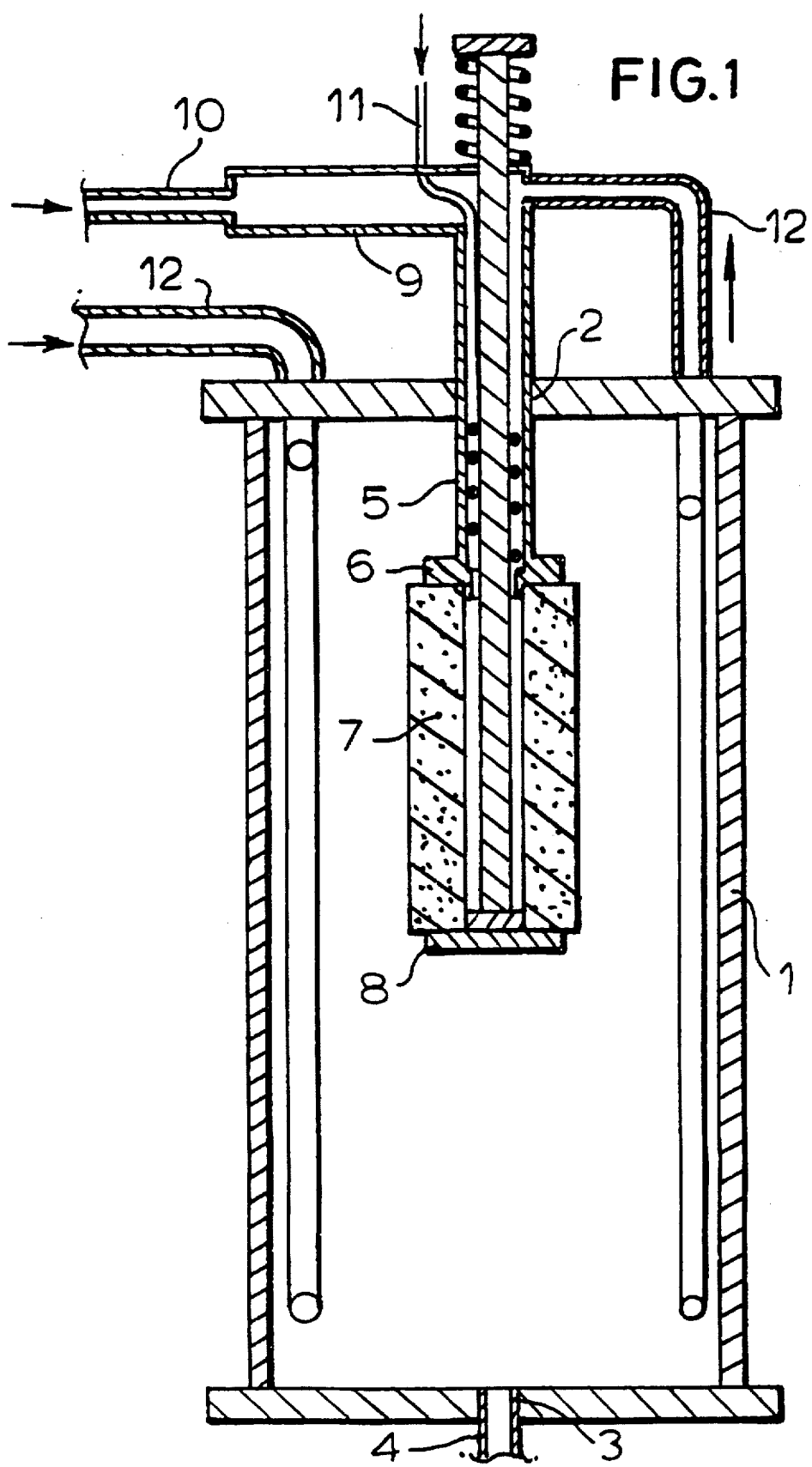
FIG. 1 describes a schematic diagram of the hydrogen-generator.

A schematic diagram of the hydrogen-generator is shown in FIG. 1. The reactor shell consisted of a stainless cylinder (height 17 cm, diameter 9 cm), 1, having a main inlet aperture, 2, and an outlet aperture, 3, to which was attached an outlet tube, 4. Fitted through the aperture 2 was a feedstock inlet tube, 5, having a flange, 6. Fitted and sealed to a stainless flange 6 was a porous ceramic tube, 7, held under compression by and sealed to a stainless steel clamping bar, 8. The feedstock inlet tube 5? had an L-shaped manifold, 9, into which was fed an air line, 10, and a feed line for the liquid feed, 11. The liquid-feed line 11 was coiled around the inlet tube 5 for heat exchange, before terminating mid-way down the porous ceramic tube 7. In this embodiment, a further air line, 12, entered the reactor 1 and was coiled around the reactor wall, for preheating the air, before entering the manifold 9. In this configuration, the fluid emerged radially from the porous ceramic tube, but it then followed an axial path through most of the catalyst bed. The volume of the catalyst bed was 850 cm$^3$.

A mixture comprising 85% methanol (by mass) in water was injected (at a rate of 5.2 cm$^3$ min$^{-1}$) into the catalyst bed through the porous ceramic tube (dimensions: 3 cm diameter, 4 cm long; pore diameter: 100 μm). The exit stream was cooled to remove any condensable components, and the dry gas was analysed for $H_2$, CO, $CO_2$, $O_2$ and $N_2$.

The bed temperature was raised (by applying an external heat source) until the onset of reaction, which occurred at ca 150° C.; the external heating was then switched off. The composition of the exit stream was recorded as a function of time-elapsed after the onset of reaction (Table 1).

A steady state was reached after about 20 minutes of operation, when the hydrogen yield leveled at 245 liters h$^{-1}$. When the volume of catalyst was taken into account, the specific output of hydrogen at steady-state was 290 liters per hour per liter of catalyst. At this stage, the maximum temperature within the catalyst bed (in the immediate vicinity of the ceramic tube) stabilised at ca 600° C., whereas the temperature inside the tube remained <100° C. Furthermore, the efficiency of the generator was close to 100% (ie each molecule of methanol converted produced 2 molecules of hydrogen). When the water was excluded from the reactant-feed, the efficiency declined to 92%.

TABLE 1

Output of axial hydrogen-generator with 4 cm long ceramic injector and 850 cm$^3$ catalyst bed; composition of reformat and hydrogen-yield

| | Time elapsed | | | |
|---|---|---|---|---|
| | 2 min | 15 min | 25 min | 30 min |
| $H_2$/% | 30 | 31 | 39 | 39 |
| CO/% | 3 | 2 | 2 | 1.8 |
| $CO_2$/% | >20 | >20 | 18 | 19 |
| $O_2$/% | 0 | 0 | 0 | 0 |
| $N_2$/% | 37 | 37 | 39 | 39 |
| $H_2$-yield/ liters h$^{-1}$ | 180 | 195 | 245 | 246 |

EXAMPLE 2

The procedure described in Example 1 was followed, except that a longer ceramic injector (dimensions: 3 cm diameter, 6 cm long) was used and the reactant feed-rates were increased (85% methanol/water 7.6 cm$^3$ min–1; air 9000 cm$^3$ min$^{-1}$). After onset of reaction, the generator reached a steady-state after about 15 minutes of operation (Table 2). In this case, the specific hydrogen output at steady state was 420 liters per hour per liter of catalyst.

TABLE 2

Output of axial hydrogen-generator with 6 cm long ceramic injector and 850 cm$^3$ catalyst bed; composition of reformat and hydrogen-yield.

|  | Time elapsed | | | | |
| --- | --- | --- | --- | --- | --- |
|  | 10 min | 15 min | 25 min | 30 min | 40 min |
| $H_2$/% | 32 | 35 | 36 | 36 | 36 |
| CO/% | 4 | 4 | 4 | 4.5 | 5 |
| $CO_2$/% | 16 | 16 | 16 | 16 | 16 |
| $O_2$/% | 0 | 0 | 0 | 0 | 0 |
| $N_2$/% | 36 | 36 | 37 | 37 | 37 |
| $H_2$-yield/ liters $h^{-1}$ | 307 | 358 | 355 | 351 | 362 |

EXAMPLE 3

Figure 2:
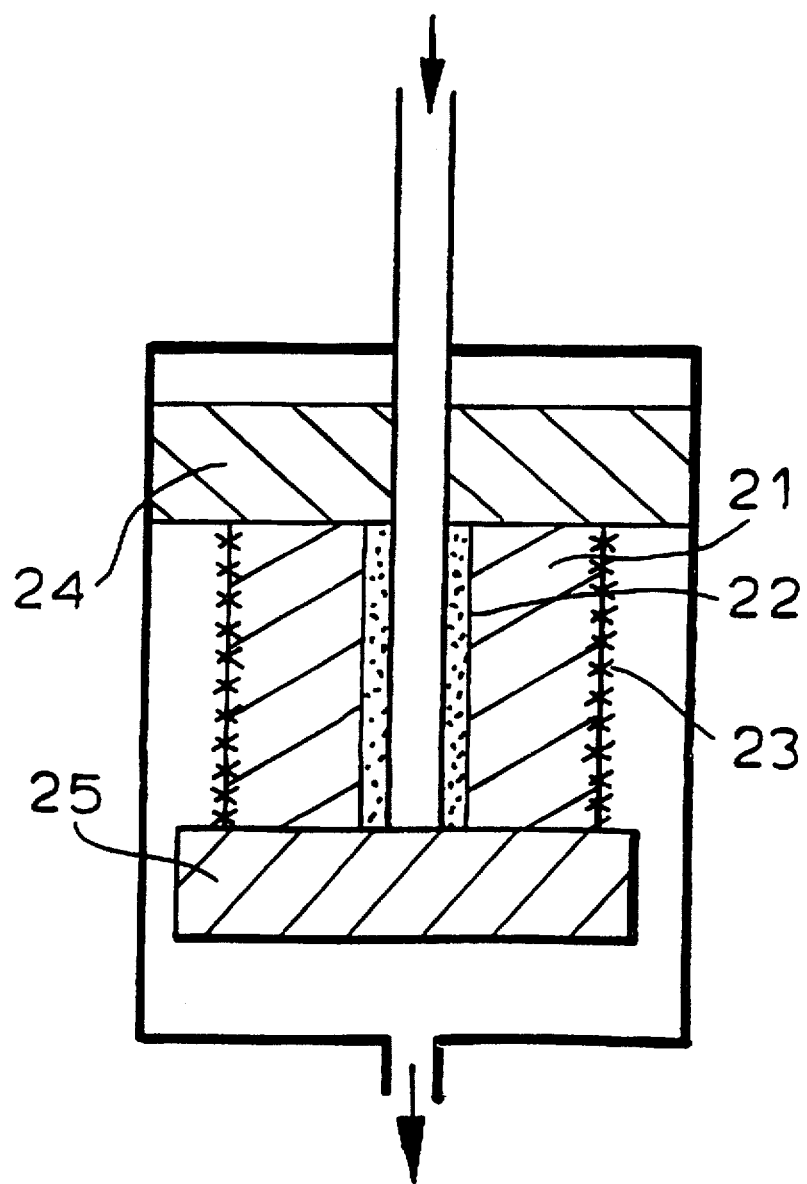
FIG. 2 describes a modified hydrogen-generator, where the catalyst bed, 21, is the same length as the porous ceramic tube, 22.

The hydrogen-generator shown in FIG. 1 was modified, as shown in FIG. 2, to allow radial flow through a smaller bed (120 cm³) of catalyst. As FIG. 2 shows, the catalyst bed, 21, was the same length (6 cm) as the porous ceramic tube, 22. The bed was enclosed by a copper gauze, 23, which allowed the products to emerge radially. Axial flow through the bed was prevented by the presence of two impervious ceramic plugs, 24 and 25.

The catalyst was prepared and activated in the way described in Example 1. Neat methanol was injected (at a rate of 3.6 cm³ min⁻¹) together with air (2500 cm³ min⁻¹) into the catalyst bed through the porous ceramic tube. An external heat source was applied, but only until the onset of reaction. After onset, a steady state was quickly reached (within 3 minutes), where the specific hydrogen output was 690 liters per hour per liter of catalyst (Table 3). By increasing the air feed-rate (to 4000 cm³ min⁻¹), the hydrogen yield was increased to a maximum of 93 liters h⁻¹, which corresponded to a specific output of 775 liters per hour per liter of reactor.

TABLE 3

Output of radial hydrogen-generator with 6 cm long ceramic injector and 120 cm³ catalyst bed; composition of reformat and hydrogen-yield.

|  | Time elapsed | | | |
| --- | --- | --- | --- | --- |
|  | 3 min | 25 min | 45 min | 60 min |
| $H_2$/% | 32.5 | 32 | 33 | 32 |
| CO/% | 5 | 5.5 | 4 | 3.5 |
| $CO_2$/% | 16 | 15.5 | 16.5 | 16.5 |
| $O_2$/% | 0 | 0 | 0 | 0 |
| $N_2$/% | 43 | 43 | 42 | 42 |
| $H_2$-yield/ liters $h^{-1}$ | 86 | 80 | 84 | 81 |

EXAMPLE 4

A 5% Cu/Al₂O₃ catalyst (nominal composition by mass) was prepared by adding copper(II) ethanoate (82.4 g) to a concentrated solution (0.880) of ammonia (320 cm³). The resultant solution was added slowly to alumina extrudate (Norton 6173; 500 g) in a rotating blender. The extrudate was then heated under nitrogen, using a water bath, until the individual pellets had changed colour (from deep blue to pale blue), indicating that most of the ammonia had been removed. The pellets were subsequently dried (110° C.; 16 hr), calcined (400° C.; 2 hr), and activated (400° C.; 2 hr; 10% H₂/N₂).

The same preparative steps were also used to make a smaller batch of 5% Pd/Al₂O₃ catalyst, starting from palladium(II) ethanoate (6.4 g) and alumina extrudate (same source as above; 23.75 g).

The 5% Cu/Al₂O₃ and 5% Pd/Al₂O₃ catalysts were mixed together in a ratio of 19:1 by mass. The resulting catalyst mixture was packed as a thin radial bed (2.5 mm deep), which fitted concentrically around a porous ceramic tube (11.4 cm long; 3 cm diameter) and was held in place by a copper gauze (11.4 cm long; 3.5 cm diameter). The volume of catalyst mixture used in the radial bed was only 55 cm³.

An atomised liquid feed comprising 85% methanol (by mass) in water was injected (at a rate of 3.1 cm³ min⁻¹) together with air (3000 cm³ min⁻¹) through the porous ceramic tube into the cold (20° C.) bed of mixed catalyst The bed temperature began to rise immediately, and within a minute it was approaching the steady-state maximum (500° C.). At steady-state, the average hydrogen yield was 175 liters h⁻¹ (Table 4), which corresponded to a specific hydrogen output of 3200 liters per hour per liter of catalyst. The radial catalyst bed and the porous ceramic tube contained within it, could be enclosed in a 150 cm³ canister. When the volume of the canister was taken into account, the reactor-specific hydrogen output was 1150 liters per hour per liter of reactor.

TABLE 4

Steady-state output of radial hydrogen-generator with 11.4 cm long ceramic injector and 55 cm³ catalyst bed, operating at 100% methanol conversion; composition of reformat and hydrogen yield.

|  | Time elapsed | | | | | |
| --- | --- | --- | --- | --- | --- | --- |
|  | 165 min | 190 min | 215 min | 260 min | 290 min | 315 min |
| $H_2$/% | 41.7 | 43.5 | 41.7 | 40.4 | 40.6 | 40.4 |
| CO/% | 2.9 | 3.1 | 3.1 | 3.1 | 3.2 | 3.3 |
| $CO_2$/% | 19.5 | 19.7 | 19.7 | 18.3 | 18.1 | 18.3 |
| $O_2$/% | 0 | 0 | 0 | 0 | 0 | 0 |
| $N_2$/% | 35.3 | 31.6 | 33.9 | 36 | 35.1 | 35.6 |
| $H_2$-yield/ liters $h^{-1}$ | 174 | 182 | 187 | 165 | 170 | 164 |

When the reactant stoichiometry was changed to a methanol-rich feed (85% methanol/water; 3.5 cm³ min⁻¹; air: 2500 cm³ min⁻¹), the average hydrogen yield at steady-state rose to 200 liters h¹ (Table 5). At the same time, the bed temperature decreased to 370° C., and the methanol conversion dropped from 100% to 70%. However, the hydrogen concentration in the product stream was higher than expected (on the basis of all the converted methanol undergoing partial oxidation), indicating that some of the hydrogen was being generated by steam reforming.

Under the methanol-rich conditions, the specific hydrogen output was 3600 liters per hour per liter of catalyst, or 1300 liters per hour per liter of reactor when the volume of the canister was taken into account.

TABLE 5

Steady-state output of radial hydrogen-generator with 11.4 long ceramic injector and 55 cm³ catalyst bed, operating at 70% methanol conversion; composition of reformat and hydrogen yield.

| | Time elapsed | | | | | |
|---|---|---|---|---|---|---|
| | 65 min | 225 min | 315 min | 410 min | 560 min | 1050 min |
| $H_2$/% | 48.1 | 47.0 | 45.9 | 46.9 | 47.0 | 46.8 |
| CO/% | 2.3 | 2.4 | 2.8 | 2.7 | 2.6 | 2.8 |
| $CO_2$/% | 19.6 | 18.3 | 19.2 | 19.5 | 19.2 | 18.2 |
| $O_2$/% | 0 | 0 | 0 | 0 | 0 | 0 |
| $N_2$/% | 27 | 28 | 29.7 | 28 | 27.2 | 27.3 |
| $H_2$-yield/ liters $h^{-1}$ | 192 | 175 | 206 | 219 | 200 | 198 |

COMPARATIVE EXAMPLE 1

The copper/silica catalyst, as prepared and activated in Example 1, was tested in a reactor fitted with a single point-injector (as described by J. W. Jenkins, EP 0 217 532. Using the same proportions of methanol/water/air as in Examples 1 and 2, hydiogen-yields which were below 10 liters $h^{-1}$ could be generated. However, in order to achieve higher yields (up to a maximum of 15 liters $h^{-1}$), a continuous source of external heating (250W) had to be applied.

We claim:

1. A self-sustaining hydrogen generator reactor for a feedstock fluid comprising an organic fuel in liquid spray, vapour or gas form and a source of oxygen, said reactor comprising a bed of a permeable mass of catalyst, and said reactor further comprising an inlet for the feedstock which comprises a porous member causing substantial pressure drop at least sufficient to prevent back-flow of products, whereby the fluid is subject to high velocity injection into the bed and fluid expansion.

2. A reactor according claim 1, wherein the inlet comprises an extended area of porous ceramic with a majority of the external surface area in contact with a bed of catalyst.

3. A reactor according to claim 2, wherein the porous ceramic is in the form of a tube, with a radial catalyst bed held concentrically around it 4. A reactor according to claim 1, wherein the catalyst contains supported copper.

5. A reactor according to claim 1, including means to provide pre-heating.

6. A reactor according to claim 1 which includes a catalyst that allows start-up from ambient temperature.

7. A method for the self-starting, self-sustaining production of hydrogen from a feedstock comprising passing a fuel and a source of oxygen over a bed which is a mass of catalyst comprising copper and precious metal moieties, characterised in that the feedstock enters the mass of catalyst through a porous member causing a substantial pressure drop at least sufficient to prevent back-flow of products, and whereby there is high velocity injection of feedstock into the mass of catalyst and feedstock expansion.

8. A method according to claim 7, wherein a hot zone exists in the catalyst mass close to the injection point.

9. A method according to claim 8, wherein the hot zone is at a temperature of approximately 150°–600° C.

10. A method according to claim 7, wherein there is relatively no back flow of product hydrogen.

11. A method according to claim 7, wherein water is simultaneously injected into the catalyst mass with the feedstock.

12. A method according to claim 11, wherein the added water reacts with some of the methanol to generate hydrogen.

13. A method according to claim 7, wherein the CO concentration of the product gas is reduced by passing said product gas over a low temperature water-gas shift catalyst.

14. A method according to claim 7, wherein the CO concentration of the product gas is reduced by passing said product gas together with an added source of oxygen over a catalyst that selectively oxidises CO in preference to hydrogen.

15. A method according to claim 7, wherein the CO concentration of the product gas is reduced by passing said product gas over a low temperature water-gas shift catalyst and then a selective oxidation catalyst in succession.

16. A method according to claim 7, wherein the fuel is methanol.

17. A fuel cell system comprising a hydrogen generator reactor according to claim 1.

* * * * *